United States Patent
Branscomb

(10) Patent No.: US 6,883,866 B2
(45) Date of Patent: Apr. 26, 2005

(54) FLEXIBLE SEAT

(76) Inventor: David A. Branscomb, 8638 Harvest La., Dubuque, IA (US) 52003

(*) Notice: Subject to any disclaimer, the term of this patent is extended or adjusted under 35 U.S.C. 154(b) by 0 days.

(21) Appl. No.: 10/621,960

(22) Filed: Jul. 17, 2003

(65) Prior Publication Data

US 2004/0012233 A1 Jan. 22, 2004

Related U.S. Application Data

(60) Provisional application No. 60/397,358, filed on Jul. 19, 2002.

(51) Int. Cl.$^7$ .................................................. B62J 1/02
(52) U.S. Cl. ............. 297/215; 297/195.11; 297/452.49; 5/724
(58) Field of Search ........................ 297/195.11, 195.12, 297/214, 215.1, 218.1, 218.2, 218.3, 218.5, 219.11, 295.12, 196, 198, 208, 452.49, 452.54, 452.52; 267/133, 164, 142; 5/719, 724

(56) References Cited

U.S. PATENT DOCUMENTS

| | | | |
|---|---|---|---|
| 1,577,340 A | | 3/1926 | Mesinger |
| 1,916,056 A | * | 6/1933 | Lamplugh ..................... 267/83 |
| 2,316,628 A | * | 4/1943 | Schaffner .................... 267/102 |
| 2,600,915 A | | 6/1952 | Persons ..................... 155/5.22 |
| 3,095,188 A | | 6/1963 | Giese .......................... 267/89 |
| 3,378,299 A | | 4/1968 | Sandor ....................... 297/284 |
| 3,588,171 A | * | 6/1971 | Rich, Jr. ................. 297/215.16 |
| 3,603,639 A | | 9/1971 | Wilson ....................... 297/219 |
| 3,669,498 A | | 6/1972 | Meyers et al. .............. 297/452 |
| 3,736,020 A | | 5/1973 | Pilachowski ................. 296/63 |
| 3,833,259 A | | 9/1974 | Pershing ..................... 297/452 |
| 4,124,248 A | | 11/1978 | Mayer ........................ 297/204 |
| 4,736,932 A | * | 4/1988 | Haslim ........................ 188/83 |
| 5,353,734 A | * | 10/1994 | Tani ........................... 114/363 |
| 5,722,729 A | | 3/1998 | Carilli .................... 297/452.55 |
| 5,735,229 A | * | 4/1998 | House et al. ............... 114/363 |
| 5,944,380 A | | 8/1999 | Atherley .................. 297/195.1 |
| 6,086,149 A | | 7/2000 | Atherley .................. 297/195.1 |
| 6,629,728 B2 | * | 10/2003 | Losio et al. ............. 297/195.1 |
| 6,739,655 B1 | * | 5/2004 | Schwochert et al. ... 297/195.12 |

FOREIGN PATENT DOCUMENTS

| | | | | |
|---|---|---|---|---|
| JP | 06315421 A | | 11/1994 | ............ A47C/7/18 |

* cited by examiner

Primary Examiner—Peter M. Cuomo
Assistant Examiner—Stephen D'Adamo
(74) Attorney, Agent, or Firm—Angenehm Law Firm; N Paul Friederichs

(57) ABSTRACT

A snowmobile seat, including a base; selective fasteners mounted to the base, the selective fasteners including inner posts and offset outer posts on a first side of the base and on a second side of the base, the inner posts and outer posts defining a groove; a flexible support having a first side and a second side, the first side being interposed between the inner and outer posts on the first side of the base, the second side being interposed between the inner and outer posts on the second side of the base, the flexible supported being bowed, the flexible support being adapted to support the weight of a rider, and the flexible support defining apertures; a foam overlay disposed over the flexible support; and a fabric overlay disposed over the foam overlay.

15 Claims, 7 Drawing Sheets

US 6,883,866 B2

FLEXIBLE SEAT

The present application claims priority from provisional patent application No. 60/397,358, entitled SNOWMOBILE SEAT, and filed on Jul. 19, 2002.

FIELD OF THE INVENTION

The present invention is a light weight seat for use in wet environments and more particularly a seat designed to absorb less moisture and release moisture build-up.

BACKGROUND OF THE INVENTION

Snowmobiles are driven across the snow in powder, wet, hard crust and other consistencies of snow as well as open water. The snowmobiles will on occasion tip over into the snow. Thus, one can readily see that snowmobiles readily take up snow and water into various parts of the vehicle. Water is readily dried from the metal components. The wetness, however, becomes entrapped into the seat, adding many pounds to the weight of the snowmobile and if not readily dried out can cause deterioration and in freezing conditions can cause the seat to become hard and uncomfortable.

The sport of snowmobiling takes many forms and is enjoyed by countless people, including the hobbiest, worker, and racer. Wetness of the seat affects all groups of snowmobilers in the manner of comfort and performance. Snowmobilers often desire the lightest weight and highest powered snowmobiles available to obtain maximum performance. Hauling the added weight of water precludes top performance for all riders.

Consequently, the staunchest snowmobilers remove their seat at the end of each day from the snowmobile and attempt to dry the seat out overnight and reduce the weight for the next day. This has provided marginal success, but requires more effort. Moreover, the construction of the standard seat allows moisture to reach deep within the recesses of the seat and not be subject to evaporation for weeks. Most snowmobilers suffer through the problem of added weight and decreased comfort.

Some solutions to solve the weight problem, include the use of rigid closed celled foams, such as Styrofoam. This, however, is uncomfortable to the snowmobiler due to the rigidity. Thus, while weight is controlled, it is done so at the sacrifice of comfort.

What is needed is a snowmobile seat that provides cushioning for the rider. The seat should use minimal foam padding, which absorbs moisture, to keep the weight of the vehicle as low as possible. Reduction of the foam padding should not reduce the cushioning of the seat. Preferably, the seat should have a structure for squeezing moisture out of the foam padding while underway.

SUMMARY OF THE INVENTION

Figure 1:
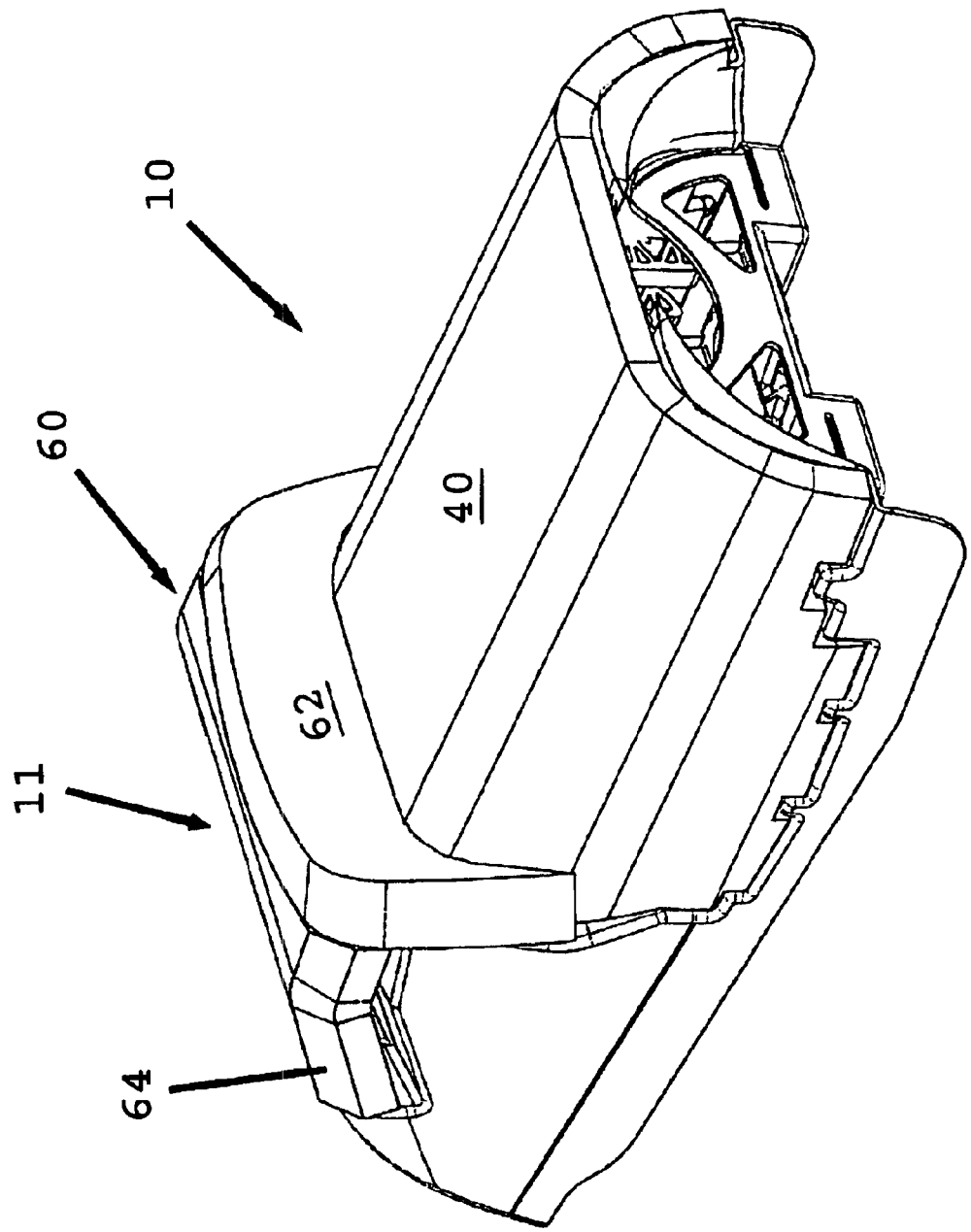
FIG. 1 is a perspective view showing the components assembled without the fabric overlay.

The present invention is a snowmobile seat that provides cushioning for the rider. The seat uses minimal foam padding, which absorbs moisture, to keep the weight of the vehicle as low as possible. Reduction of the foam padding does not reduce the cushioning of the seat as the additional cushioning is provided by a non-absorbent flexible member. The seat has a structure for squeezing moisture out of the foam padding while underway.

More particularly, the snowmobile seat may include a base; a flexible support; a foam overlay and a fabric overlay. The flexible support may be joined to the base. The flexible supported desirably is bowed to form a spring and the flexible support can be adapted to support the weight of a rider. The foam overlay and fabric overlay may be disposed over the flexible support.

In operation, the method of preparing a snowmobile seat may include the steps of a user selecting a flexible support based upon their weight and desired rigidity of the seat; fastening a first side of the flexible support to a first side of a base; bowing the flexible support; connecting a second side of the flexible support a second side of the base; overlaying the flexible support with foam; placing a fabric overlay over the foam; and fastening the fabric to the base.

Advantageously, the present invention provides approximately a 30–50% reduction in weight over conventional seats of similar size.

As a further advantage, the present invention absorbs less moisture and removes moisture from the seat, avoiding a 25–30% weight increase of the seat when in use.

Also advantageously, the present invention provides a structure for squeezing moisture from the seat while underway.

As still yet another advantage, weight control is achieved without sacrificing comfort.

These and other advantages will become apparent from reading the below description.

DETAILED DESCRIPTION

The snowmobile seat 10 may include a base 12, a flexible support 30, a foam overlay 40 and a fabric overlay 50. The seat 10 provides support to a user while riding, cushioning spring-like comfort over rough terrain, and defines an air pocket 38 to relieve moisture. Each of these components will be discussed in serial fashion.

The base 12 may be similar to other bases of snowmobiles providing structure with which to connect the seat to the snowmobile frame. An upper surface 13 of the base 12 may be joined to fasteners 14 located on both the first side 22 and second side 24 thereof. The fasteners 14 desirably are suitable for selectively joining the flexible support 30 to the base 12. The most desired fastener 14 is a tongue and groove type fasteners 14, having inner posts 16 and outer posts 18 cooperatively defining a groove 20. The groove 20 is sized to receive the flexible support 30.

The flexible support 30 is intended to be one or more flat non-absorbent flexible sheets, which may have relief apertures 32 defined therethrough, and first and second sides 34, 36 respectively. The width between the first and second sides 34, 36 is preferably greater than the distance between the inner and outer posts 16, 18 of the first side 22 of the base 12 and the inner and outer posts 16, 18 of the second side 24.

In such configuration, the flexible support 30 bows when the first side 34 of the flexible support 30 is placed in the groove 20 on the first side 22 of the base 12 and when the second side 36 of the flexible support 30 is placed in the groove 20 on the second side 24 of the base 12.

Figure 3:
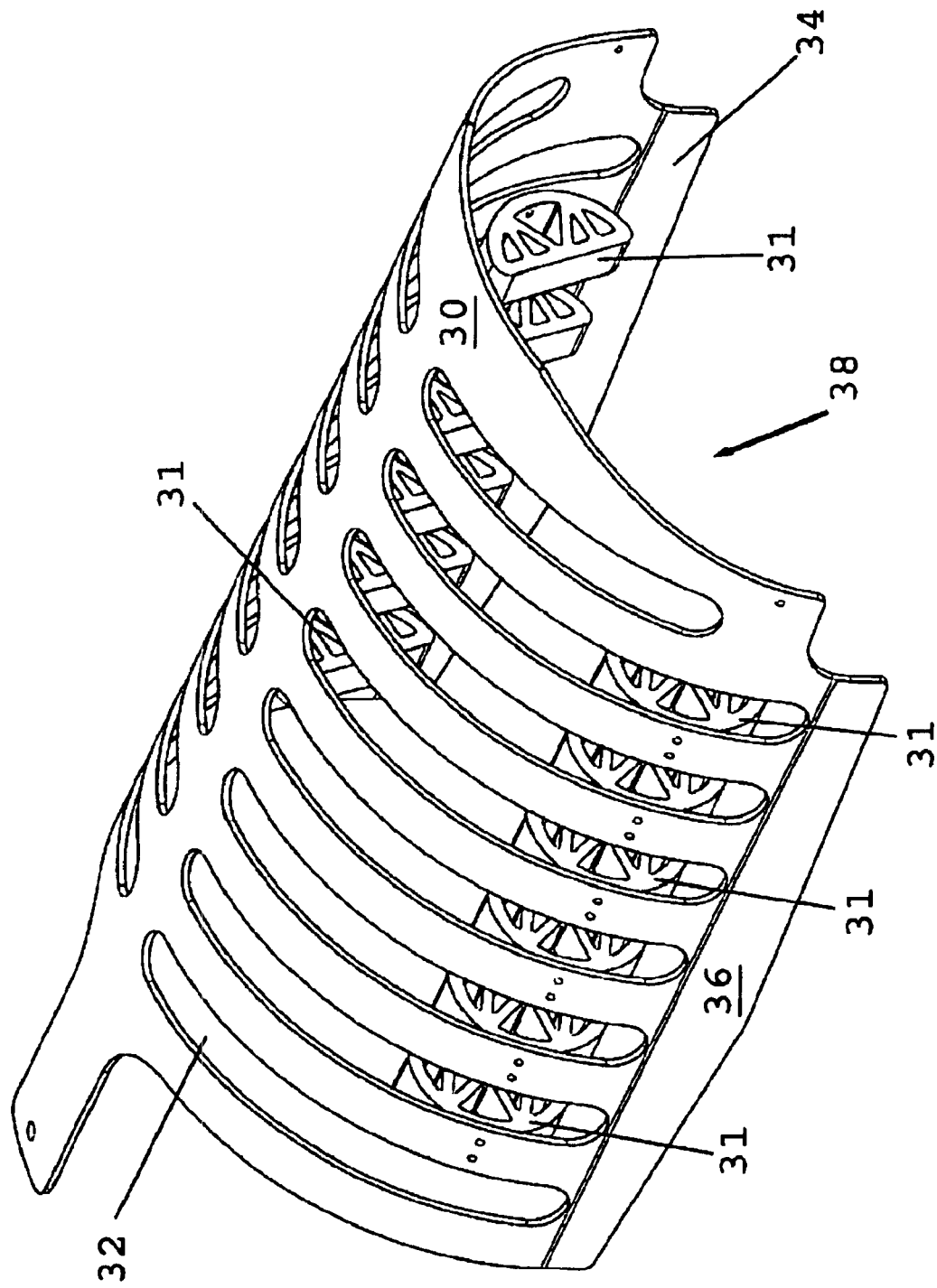
FIG. 3 is a perspective view showing the flexible support joined to the curved supports.
Figure 4:
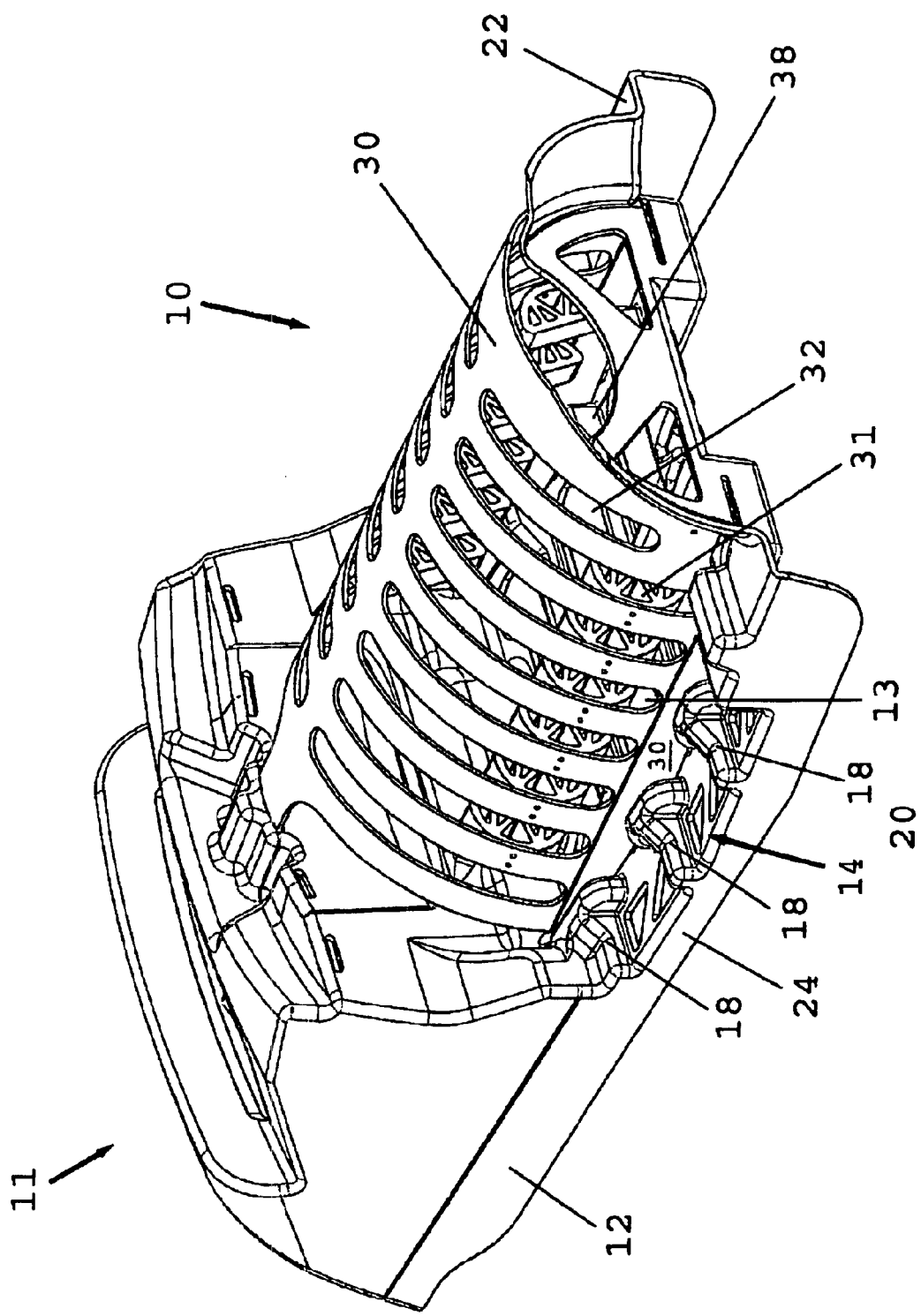
FIG. 4 shows the flexible member joined to the base.
Figure 5:
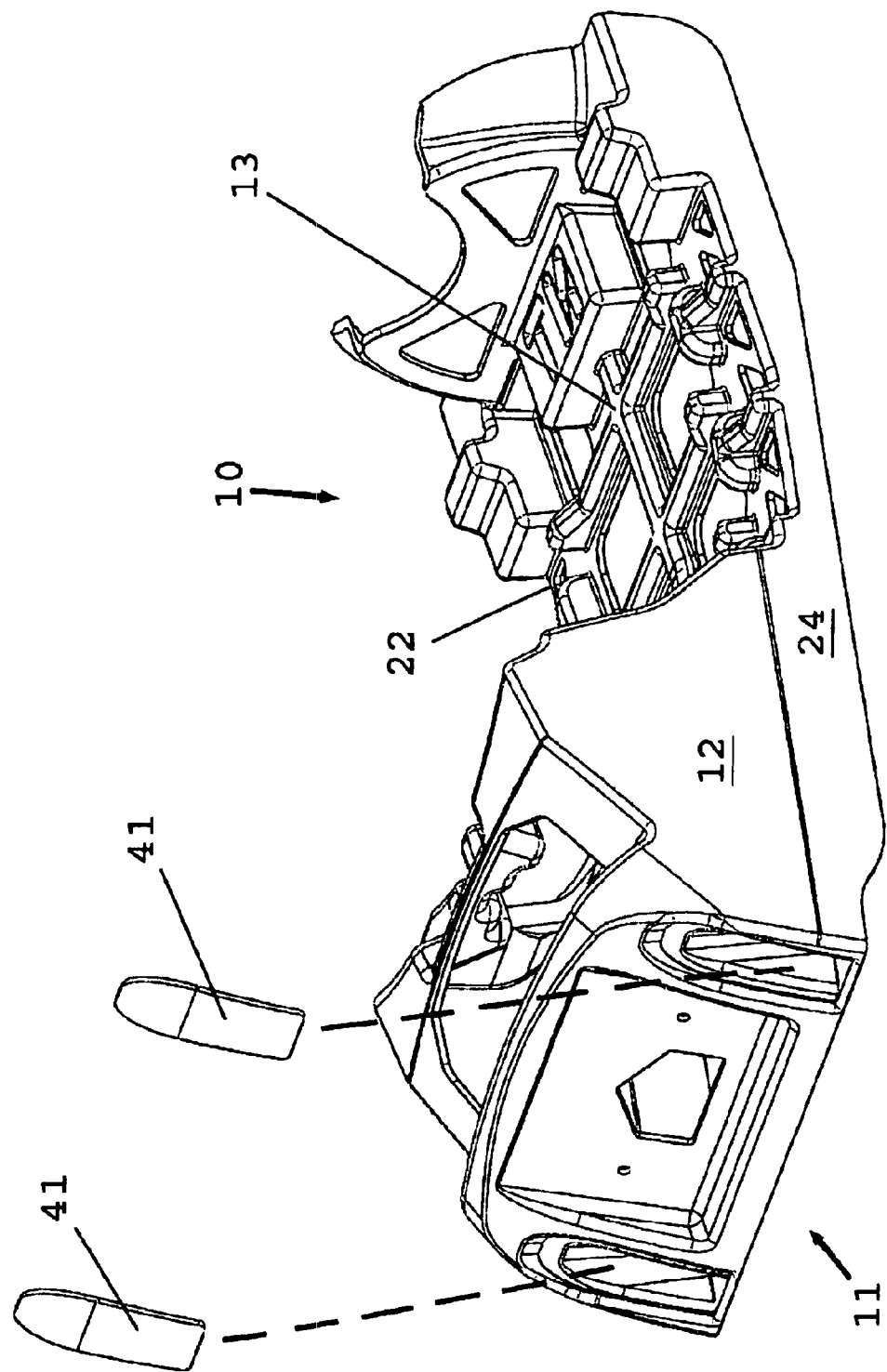
FIG. 5 is an exploded view showing the fastener joined to the base and the end caps.

The flexible support 30 is desirably adapted to support the weight of a rider. The flexibility of the support 30 can be selected based upon the intended support to be provided to a user. Flexible supports 30 of varying flexibility or multiple flexible supports 30 may be used to increase the resistance for heavier users or conversely for lighter riders. Selective fasteners 14 in combination with the number and rigidity of the flexible supports 30 provide for adjustment of the seat to particular users, while still allowing the product to be mass produced. Curved supports 31 may be fastened to the flexible support 30 to control the location and extent of the bending of the flexible support 30 as shown in FIG. 3. The curved supports 31 limits the bending of the flexible member 30 in the area of attachment of the curved supports 31 to a point where the flexible member 30 conforms to the shape of the curved supports 31.

Apertures 32 defined through the flexible support 30 and the material forming the flexible support 30 should be such as to allow moisture from the seat to pass through and away from the seat. Moisture from snow or other precipitation and perspiration add weight and discomfort to the snowmobile. The flexible support 30, while providing cushioning, also preferably acts as a mechanism to squeeze the moisture from other portions of the seat 10 and the apertures 32 provide a mechanism through which the moisture may be released from the seat 10.

Figure 2:
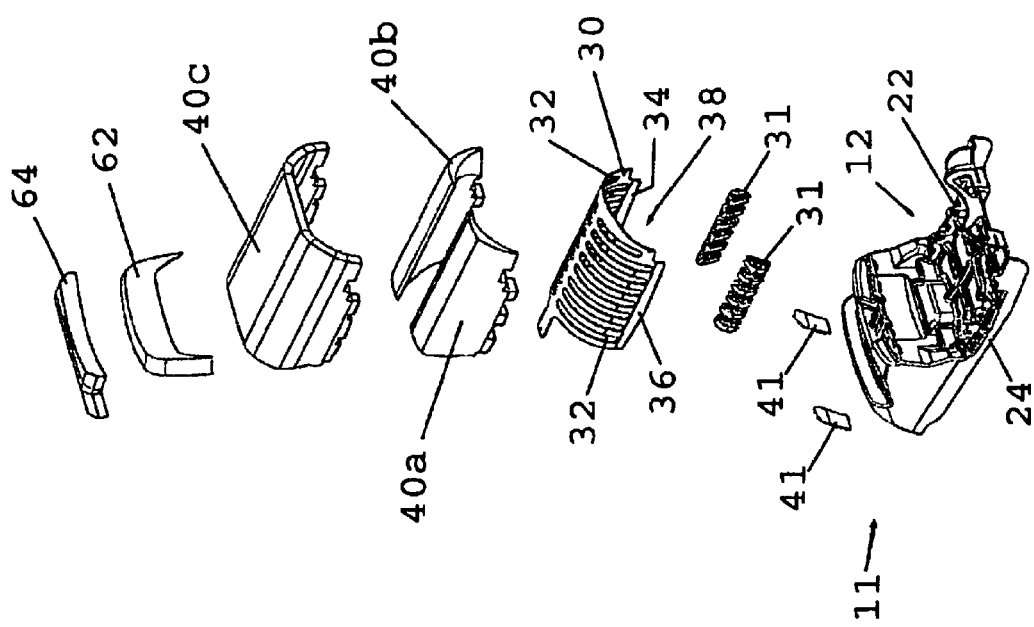
FIG. 2 is an exploded view of the present invention.

A foam overlay 40 may be positioned over the flexible support 30 to add additional cushioning and provide a smooth sifting surface around the apertures 32 defined in the flexible member 30. The foam overlay 40 may be of the same material commonly used in snowmobile seats, although it may be made much thinner due to the cushioning provided by the flexible support member 30. The reduced thickness of the foam overlay 40, perhaps as thin as between one and two inches, reduces the area in which moisture may be retained. Moreover, it may be rung out between the weight of the user and the more rigid flexible support 30. Multiple layers or portions of foam or like material may be used to form the foam overlay 40. A multiple part foam overlay is shown in FIG. 2, having two satellite pads 40a and 40b to shape the seat 10 and a crown pad 40c to provide a smooth upper surface.

Trunk padding 60 may be positioned adjacent the back end 11 of the seat 10. Trunk padding 60 may include a hind pad 62 sized, shaped and oriented to position adjacent a riders lower back. The hind pad 62 also provides the benefit of avoiding a snowmobiler from sliding ff the snowmobile under quick acceleration, perhaps on an incline. A top pad 64 may be placed adjacent the back end 11 of the seat 10 to soften the otherwise hard surfaces.

Figure 6:
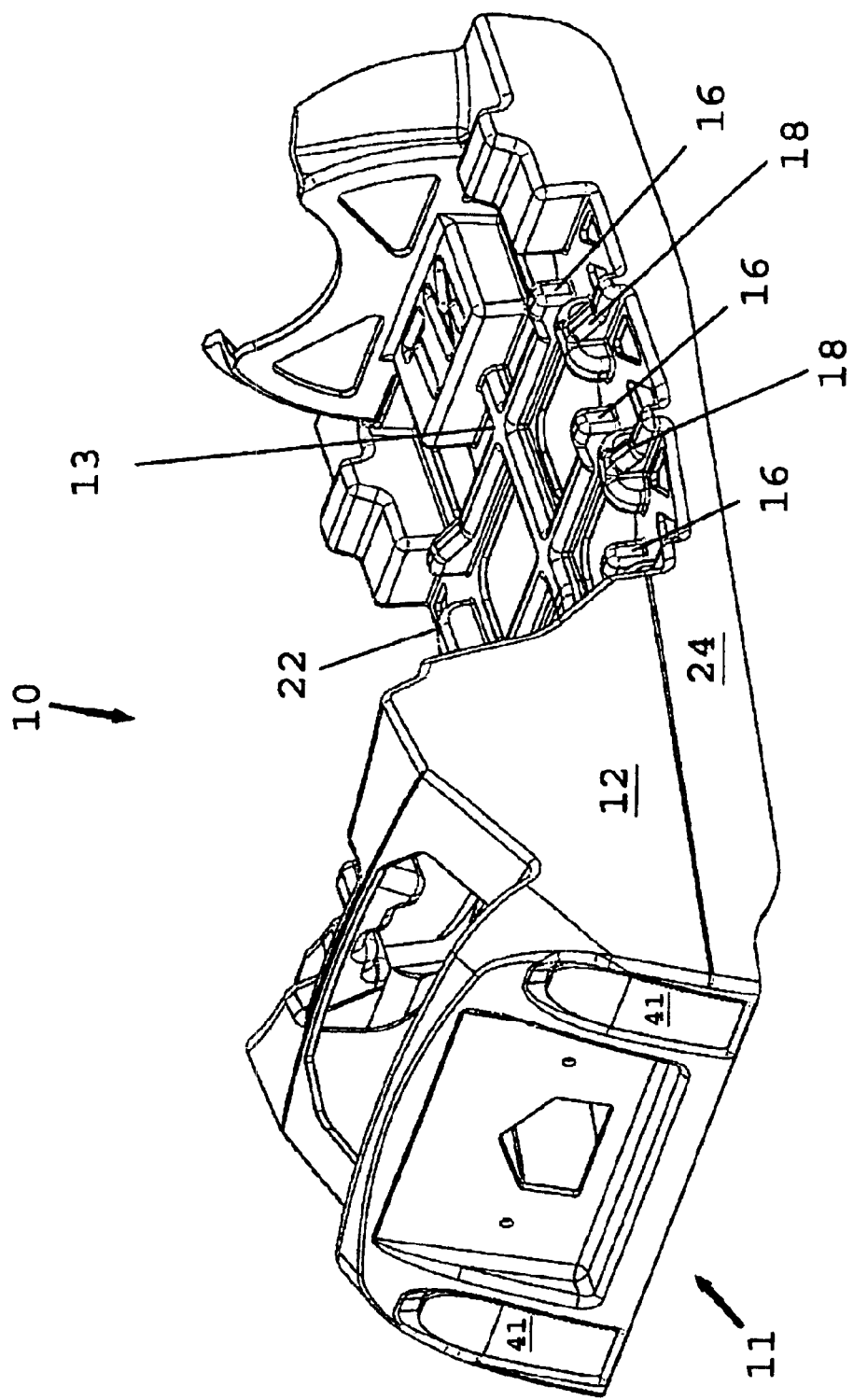
FIG. 6 is a perspective view of the snowmobile showing the end caps secured to the base.
Figure 7:
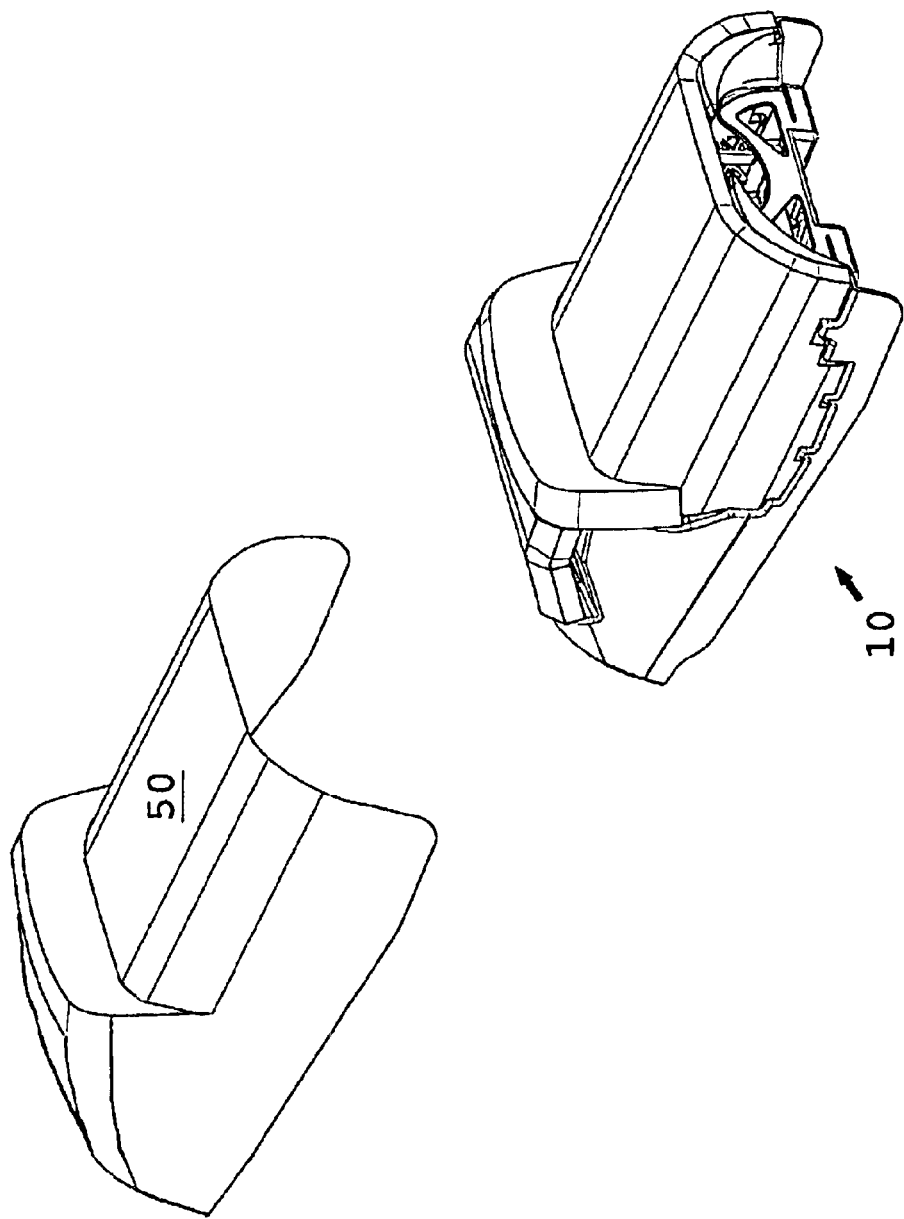
FIG. 7 shows the snowmobile seat covered with the fabric overlay.

A fabric overlay 50 may be positioned over the foam overlay 40 and trunk padding 60. The fabric overlay 50 may be of a material commonly used to cover snowmobile seats. The fabric overlay 50 primarily provides protection for the foam overlay 40 and trunk padding 60, comfort for the user and an aesthetic appearance for the snowmobile. The fabric overlay 50 may be selectively or permanently joined to the base 12 with staples, snaps, adhesive or other fasteners commonly used on snowmobile seats, although most preferably the fabric overly is selectively joined to the base 12, allowing adjustment, removal, replace or other alterations to the foam overly 40 and flexible support 30. End caps 41 may be joined to the base 12 for securement of the fabric overlay 50 as shown in FIG. 6.

In operation, a user selects a flexible support 30 based upon their weight and desired rigidity of the seat 10. A first side of the flexible support 30 is fastened, preferably selectively fastened, to the first side 22 of the base 12. The flexible support 30 is bowed and the second side 36 of the flexible support 30 is fastened to the second side 24 of the base 12. A foam overlay 40 may be placed over the flexible support 30. A fabric overlay 50 may then be secured to the base 12 overlying the foam overlay 40. As the user rides the snowmobile and moisture builds in the seat, the weight of the user and the flexible support 30 squeeze the foam overlay 40 releasing the moisture through apertures 32 defined in the flexible support 30. The seat 10 may further be dried via separation of the flexible member 30, foam overlay 40 and fabric overlay 50.

Although the present invention has been described with reference to preferred embodiments, workers skilled in the art will recognize changes may be made in form and detail without departing from the spirit and scope of the invention

We claim:

1. A seat, comprising:
   a base;
   selective fasteners mounted to the base, the selective fasteners including inner posts and offset outer posts on a first side of the base and on a second side of the base, the inner posts and outer posts defining a groove;
   a flexible support having a first side and a second side, the first side being interposed between the inner and outer posts on the first side of the base, the second side being interposed between the inner and outer posts on the second side of the base, the flexible supported being bowed, the flexible support being adapted to support the weight of a rider, and the flexible support defining apertures;
   a foam overlay disposed over the flexible support; and
   a fabric overlay disposed over the foam overlay.

2. A seat, comprising:
   a base;
   at least one flexible support joined to the base, the flexible support being bowed to form a spring, the flexible support having a first side edge joined to a first side of the base and having a second side edge joined to a second side of the base, and the flexible support being adapted to support the weight of a rider; and
   a fabric overlay disposed over the flexible support.

3. The device of claim 2 wherein the flexible support defines relief apertures.

4. The device of claim 2 further comprising:
   a foam overlay joined to the flexible support, and
   means for squeezing moisture from the foam overlay.

5. The device of claim 2 further comprising a foam joined to the flexible support.

6. The device of claim 2 further comprising a foam overlay joined to the flexible support, wherein moisture in the foam overlay is rung out between a user and the flexible support.

7. The device of claim 2 further comprising a plurality of foam overlays.

8. The device of claim 2 further comprising:
   curved supports joined to the flexible support.

9. The device of claim 2 further comprising:
   selective fasteners mounted to the base.

10. The device of claim 9 wherein the selective fasteners include inner posts and offset outer posts on a first side of the base and on a second side of the base.

11. The device of claim 10 wherein the inner posts and outer posts define a groove on the first side and on the second side of the base.

12. The device of claim 11 wherein the flexible support is positioned within the groove on the first side and the flexible support is positioned within the groove on the second side.

13. The device of claim 12 wherein the flexible supports in combination provide increased resistance over that of a single flexible support.

14. The device of claim 12 wherein the flexible supports are of varying flexibility.

15. The device of claim 14 further comprising a foam overlay joined to the flexible support, wherein the release apertures provide a passageway for moisture within the foam overlay to escape into an air pocket.

* * * * *